(12) United States Patent
Sano

(10) Patent No.: US 6,362,469 B1
(45) Date of Patent: Mar. 26, 2002

(54) ROTATION DETECTOR FOR MULTI-ROTATION BODY HAVING DETECTION WINDOW

(75) Inventor: Tadashi Sano, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/338,410

(22) Filed: Jun. 22, 1999

(30) Foreign Application Priority Data

Jun. 30, 1998 (JP) .......................................... 10-184257

(51) Int. Cl.[7] ................................................. G01D 5/34
(52) U.S. Cl. ................ 250/231.15; 341/13; 250/231.13
(58) Field of Search ...................... 324/207.25, 207.26; 250/231.13, 231.14, 231.15, 231.18; 341/11, 13

(56) References Cited

U.S. PATENT DOCUMENTS 4,789,342 A * 12/1988 Shitanoki ..................... 439/15
5,402,761 A     4/1995 Dechellis

FOREIGN PATENT DOCUMENTS

| DE | 195 23 210 C1 | 6/1995 |
|---|---|---|
| DE | 196 01 965 A1 | 1/1996 |
| EP | 0 726 452 A2 | 1/1996 |
| JP | 5-26487 | 7/1993 |

* cited by examiner

Primary Examiner—Walter E. Snow
(74) Attorney, Agent, or Firm—Brinks Hofer Gilson & Lione

(57) ABSTRACT

A rotation detector has a simple structure and operates reliably to check quickly for erroneous installation as an encoder for detecting the rotation rate of a multi-rotation body that rotates for a finite number of revolutions of one revolution or more. A stator member is formed of a housing and a cover coupled together, and a detection window is formed on an outer peripheral wall of the housing. A rotor member is rotatably supported by the housing and the cover, and a rotary ring arranged concentrically with the center of rotation of the rotor member is housed in the stator member. Rotation of the rotor member is intermittently transmitted to the rotary ring via an intermediate gear. According to the variation of outputs from photointerrupters that turn on or off according to the rotation of the rotary ring, an absolute position of the rotor member is detected. Also, an indicator is arranged on the rotary ring so that the indicator is visible through the detection window 1b only when the rotary ring is in a neutral position.

13 Claims, 8 Drawing Sheets

ROTATION DETECTOR FOR MULTI-ROTATION BODY HAVING DETECTION WINDOW

BACKGROUND OF THE INVENTION

1. Field of the Invention

The present invention relates to a rotation detector for a multi-rotation body which rotates for a finite number of revolutions of one revolution or more, and particularly, to a rotation detector suitable for detecting an absolute position of the multi-rotation body.

2. Description of the Related Art

Conventionally, there is proposed a rotation detector, as described in Japanese Examined Utility Model Publication No. 5-26487, using an increment-type encoder to detect a precise rotation angle within one revolution of a steering wheel. It also uses an absolute-type encoder to detect a rough rotation angle of more than one revolution of the steering wheel. The detector then combines the precise rotation angle and the rough angle to determine the rotation angle from a neutral position of the steering wheel The increment-type encoder is composed mainly of a code plate that rotates integrally with a steering shaft and photointerrupters opposing each other via the code plate. This encoder can detect only rotation angles of the code plate within one revolution. However, since the code plate rotates integrally with the steering shaft, the detection accuracy is high.

The absolute-type encoder is composed mainly of a substrate on which a resistance pattern is formed, a reduced-speed rotating body having a brush that slidably contacts the resistance pattern, and a gear mechanism for transmitting rotation of the steering wheel to the reduced-speed rotating body. In this case, since the rotation of the steering wheel that rotates multiple times is reduced to rotation within one cycle of the reduced-speed rotating body via the gear mechanism, an absolute position of the steering wheel can be detected.

In installation of the rotation detector as described above in a steering unit of a motor vehicle, however, the reduced-speed rotating body of the absolute-type encoder must be set to a neutral state in the rotation direction. If the reduced-speed rotating body is erroneously installed in a state which deviates from the neutral point, a precise absolute position of the steering wheel cannot be detected.

For this reason, in the conventional example as described above, after the installation of the absolute-type encoder in the steering unit, resistances which vary depending upon the position where the resistance pattern and the brush slidably contact must be electrically measured. Then, according to the variation in the resistance, a rotation status of the reduced-speed rotating body must be checked. This causes a reduction in efficiency of the installation of the rotation detector.

Also, in the conventional example, the gear mechanism composed of a sun gear arranged on a rotor member, a ring-like gear arranged on a stator member, and a planet gear engaged between the sun gear and the ring-like gear is used as the absolute-type encoder. Therefore, the arrangement space of the gear mechanism occupies in the whole rotation detector is relatively large. This causes a problem in that miniaturization of the rotation detector is difficult.

Furthermore, since the planet gear always engages with both the sun gear and the ring-like gear, the reduced-speed rotating body supporting the planet gear is rotated even by a minute rotation of the steering wheel. Particularly, since the rotation (operation) rate is subsequently high in the vicinity of the neutral position, a problem is caused in that the resistance pattern is locally worn away.

SUMMARY OF THE PRESENT INVENTION

An object of the present invention is, therefore, to provide a rotation detector having a simple structure, operating reliably, and having a capacity of checking quickly for erroneous installation as an encoder for detecting the rotation rate of a multi-rotation body that rotates for a finite number of revolutions of one revolution or more.

To achieve this object and other objects described herein, according to the present invention, a rotation detector for a multi-rotation body, as described below is provided.

The rotation detector for a multi-rotation body has a rotor member integrally rotating with a code plate of a rotary encoder, a rotary member arranged concentrically with the center of rotation of the rotor member, an intermediate gear for intermittently transmitting rotation of the rotor member to the rotary member, detecting elements for detecting an amount of rotation of the rotary member, and a stator member enclosing the rotary member, the intermediate gear, and the detecting elements.

In the rotation detector for a multi-rotation body the stator member has a detection window through which an indicator for indicating a neutral rotation position of the rotary member can be viewed.

In this arrangement, the intermediate gear may be supported by the stator member, and the indicator is arranged on the rotary member. Also, the intermediate gear may be supported by the rotary member, and the indicator may be arranged on at least one of the intermediate gear and the rotary member.

As described above, the intermediate gear may be supported either by the stator member or by the rotary member. In the case of the intermediate gear being supported by the stator member, however, the indicator must be arranged with the stator member. In the case of the intermediate gear being supported by the rotary member, the indicator may be arranged on at least one of the intermediate gear and the rotary member.

Furthermore, the detection window may be arranged on an outer peripheral wall of the stator member. Furthermore, the detection window may be arranged on a cover of the stator member.

In the present invention as described above, rotation of the rotor member is transmitted intermittently to the rotary member via the intermediate gear, and the amount of rotation of the rotary member is detected by means of the detecting elements such as photointerrupters. Concurrently, the detection window is arranged on the stator member that encloses the rotary member and the detecting elements to allow an indicator of the rotary member to be viewed.

According to the present invention configured as described above, a neutral rotation position of the rotary member can be visually checked, improving efficiency of installation of the rotation detector. Also, the intermediate gear intermittently transmits rotation of the rotor member to the rotary member. This provides an advantage in that the amount of local abrasion in structural components due to continuous operation can be significantly reduced.

Furthermore, the need for excessive large layout spaces for the individual structural components can be avoided. Therefore, miniaturization of the rotation detector for the multi-rotation body can be achieved.

DESCRIPTION OF THE PREFERRED EMBODIMENTS

Embodiments are described below with reference to the drawings.

Figure 1:
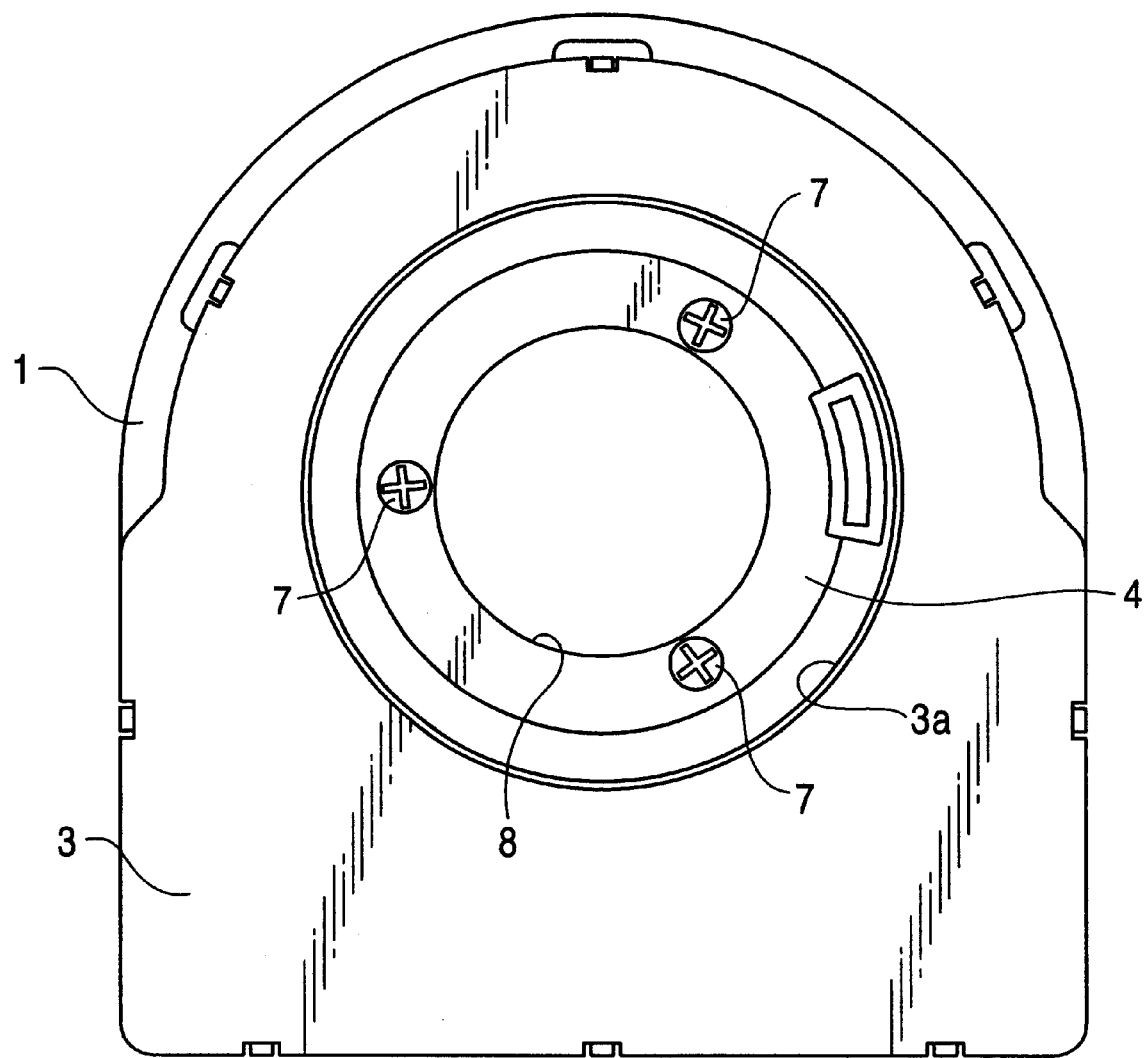
FIG. 1 is a bottom plan view of a rotation detector according to an embodiment of the present invention.
Figure 2:
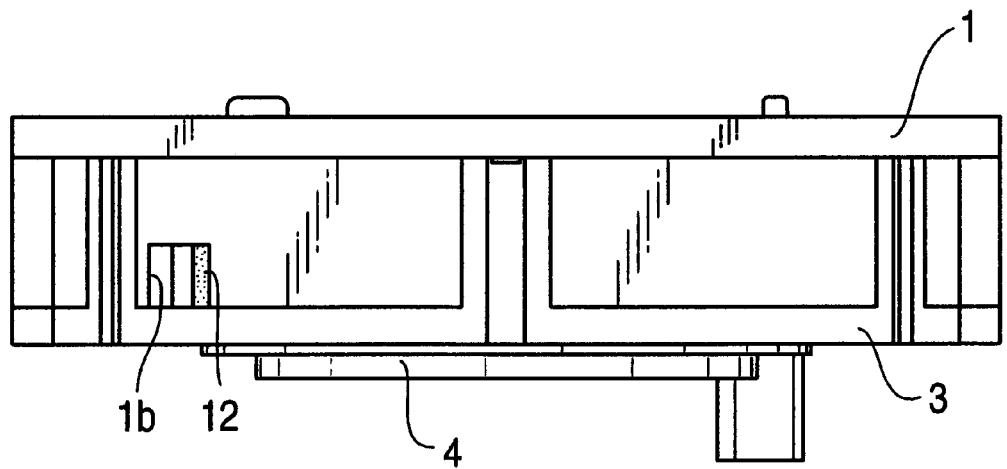
FIG. 2 is a side view of the rotation detector.
Figure 3:
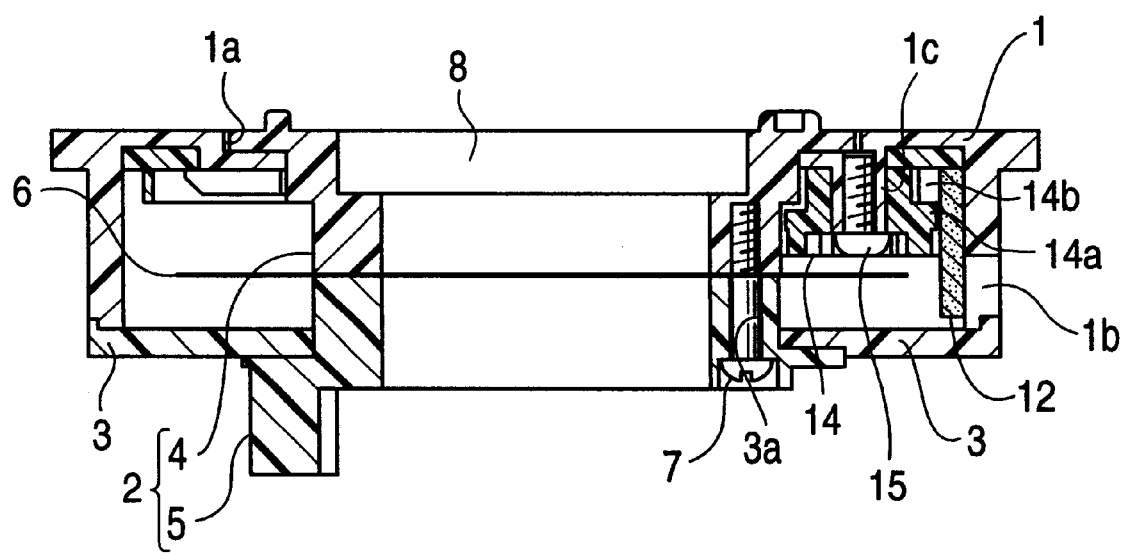
FIG. 3 is a cross-sectional view of the rotation detector.
Figure 4:
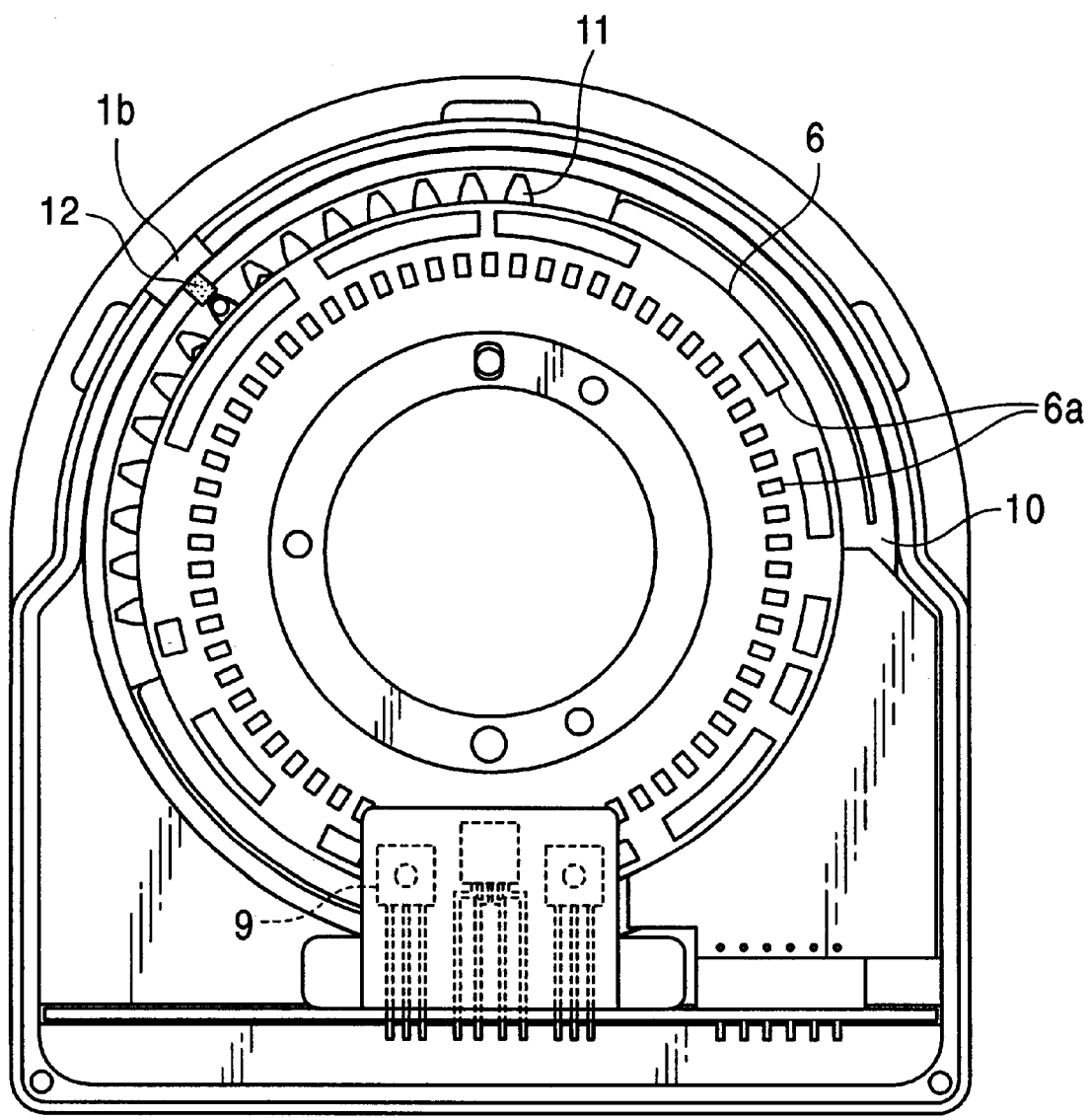
FIG. 4 is a bottom plan view of the rotation detector without a cover.
Figure 5:
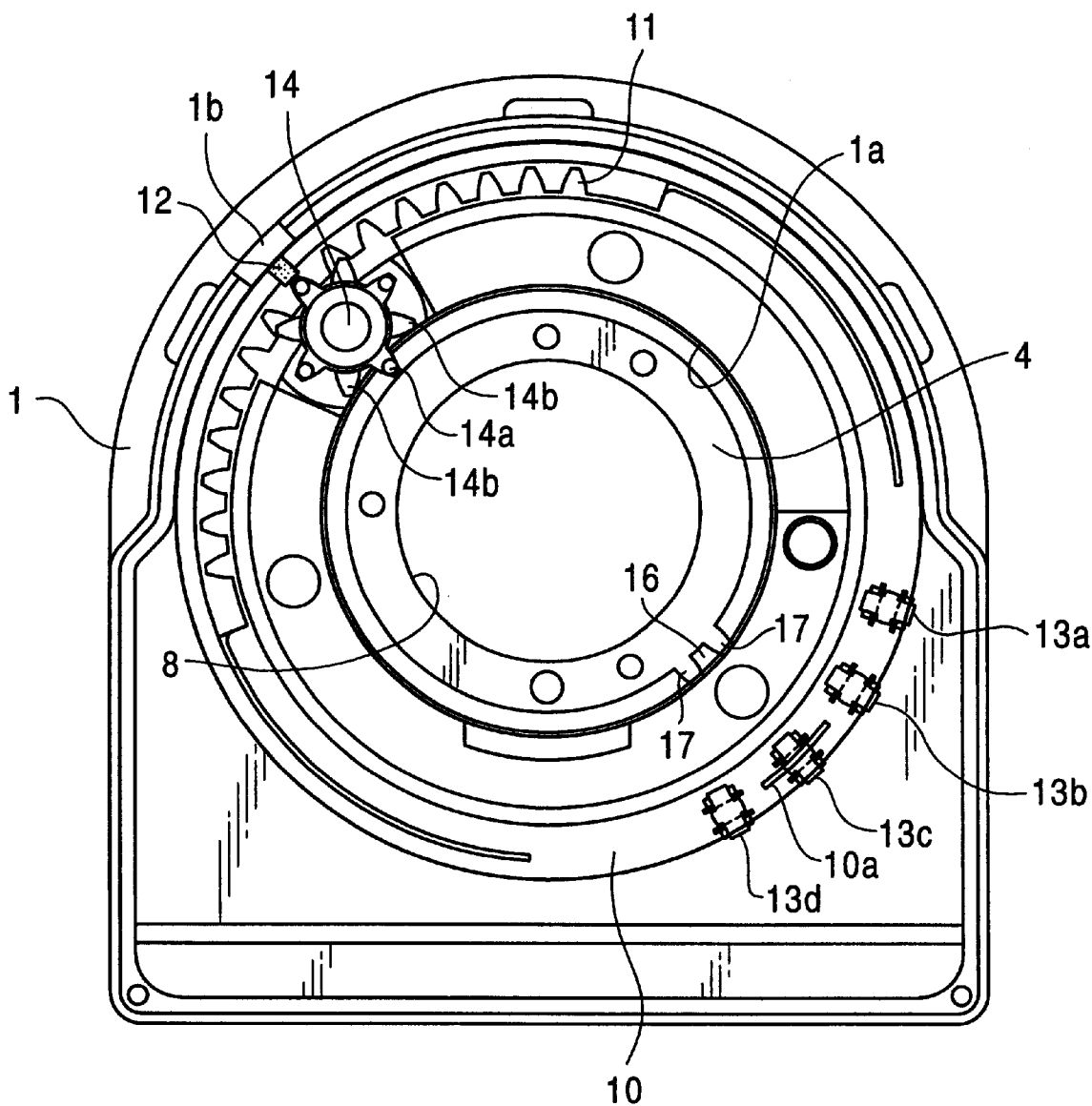
FIG. 5 is a bottom plan view of the rotation detector without the cover and a code plate.
Figure 6:
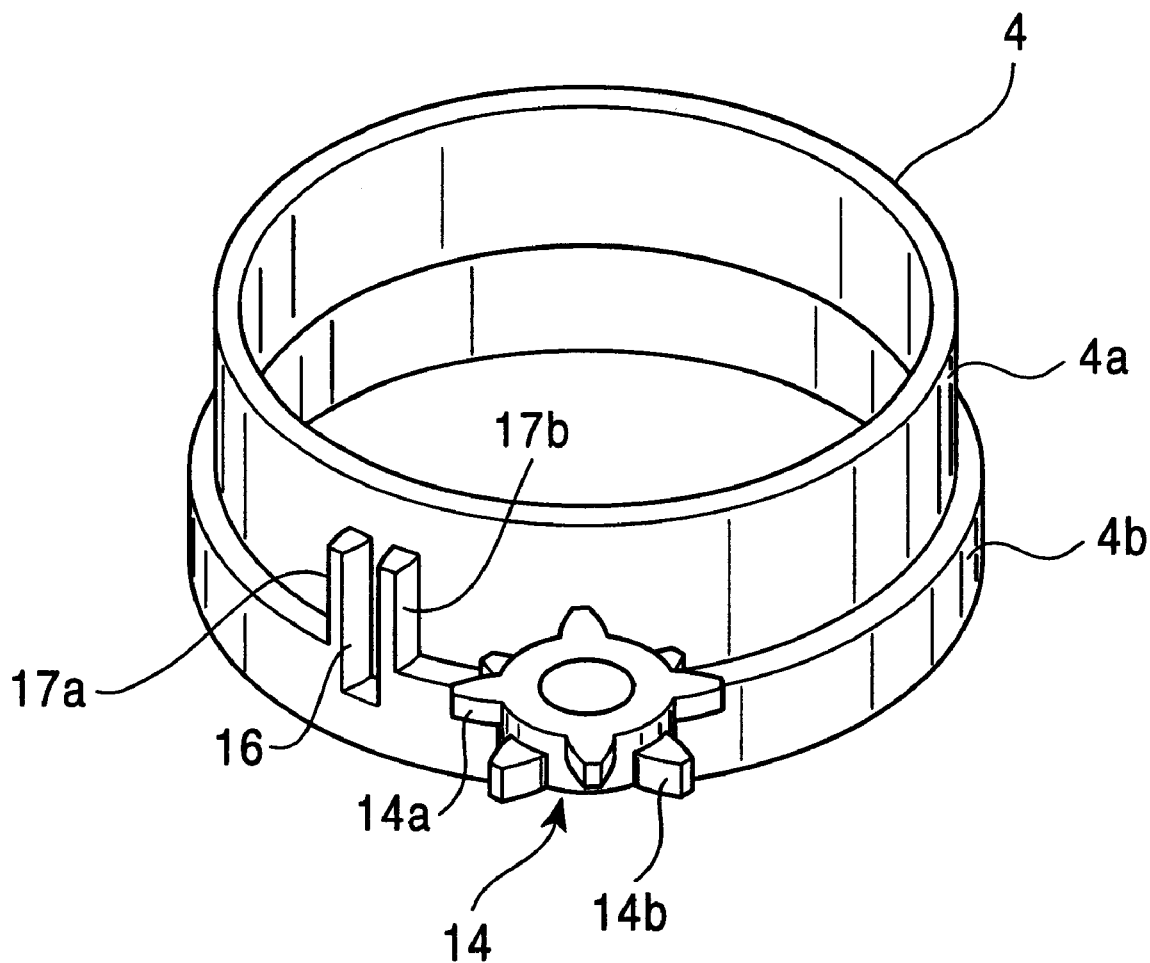
FIG. 6 is a perspective view showing main portions of a gear mechanism in the rotation detector.

FIG. 1 is a bottom plan view of a rotation detector according to the embodiment. FIG. 2 is a side view of the rotation detector. FIG. 3 is a cross-sectional view of the rotation detector. FIG. 4 is a bottom plan view of the rotation detector without a cover. FIG. 5 is a bottom plan view of the rotation detector without the cover and a code. FIG. 6 is a perspective view of main portions of a gear mechanism arranged in the rotation detector. FIG. 7 is a drawing for explanation of operation of the gear mechanism.

The rotation detector of the embodiment has a housing 1 that includes a guide opening 1a on a top surface, a cover 3 that includes a guide opening 3a and which covers a lower opening of the housing 1, and a rotor member 2 that is rotatable around the center of the guide openings 1a and 3a. The housing 1 and the cover 3 house an increment-type encoder and an absolute-type encoder for rotation-rate verification, which are described below. A detection window 1b is formed on an outer peripheral wall of the housing 1, and the cover 3 is integrally coupled with the housing 1 in a manner such as snap-coupling. The housing 1 and the cover 3 constitute a stator member, and are fixed by screws, for example, with a casing of a combination switch and an immobilizing body of a rotation connector when the rotation detector is assembled in a steering unit of a motor vehicle.

As shown in FIG. 3, the rotor member 2 is composed of a first rotor 4 and a second rotor 5, and the two rotors 4 and 5 are integrally coupled by a plurality of screws 7 via a code plate 6. A center opening 8 is formed through the two rotors 4 and 5 and the code plate 6. In installation of the rotation detector in a steering unit of a motor vehicle, a steering shaft (not shown) is inserted through the center opening 8, and the steering shaft rotates together with the two rotors 4 and 5 and the code plate 6.

As shown in FIG. 4, a plurality of throughholes 6a are formed on the code plate 6 along the peripheral direction thereof. A-phase and B-phase patterns are detected by three photointerrupters 9 arranged in such a manner as to cross the throughholes 6a. The code plate 6 and the individual photointerrupters 9 constitute the increment-type encoder, and the increment-type encoder detects, with high accuracy, rotation angles of the code plate 6 within one revolution.

The absolute-type encoder is described below.

As shown in FIG. 5, a rotary ring 10 is arranged as a rotary member in the housing 1. The rotary ring 10 is rotatable on a locus sharing the same center with the guide opening 1a. A driven gear 11 is engraved on the rotary ring 10 over a range of substantially 90 degrees. An indicator 12 is arranged on an outer peripheral surface of the driven gear 11 for indicating a neutral rotation position of the rotary ring 10. The indicator 12 may be any type as long as it is viewable through the detection window 1b of the housing 1 during rotation of the rotary ring 10. For example, it may be of the type of a printed marking on the outer peripheral surface of the driven gear 11, and it may be integrally formed with the rotary ring 10.

On the rotary ring 10 is also arranged a light shield 10a in such a manner as to oppose the driven gear 11 through the center opening 8. Arranged also thereon are four photointerrupters 13a to 13d mounted on a printed board (not shown) in a manner such as to cross the light shield 10a.

An intermediate gear 14 engages with the driven gear 11. The intermediate gear 14 is rotatably supported by a boss 1c erected on an upper internal surface of the housing 1 and is dislodged by a screw 15. As shown in FIGS. 3 and 5, the intermediate gear 14 has a first toothed section 14a consisting of four teeth arranged at every 90 degrees. Similarly arranged is a second toothed section 14b consisting of four teeth arranged at every 90 degrees, with a relative phase difference of 45 degrees to the first toothed section 14a. The first and second toothed sections 14a and 14b are positioned in such a manner as to deviate from each other in the axial direction.

FIG. 6 is an inverted perspective view of the rotation detector. As shown in the figure, a small-diameter section 4a and a large-diameter section 4b are formed on an outer peripheral surface with a lateral step therebetween. The small-diameter section 4a opposes the first toothed section 14a of the intermediate gear 14, and the large-diameter section 4b opposes the second toothed section 14b. A relief groove 16 is formed on the large-diameter section 4b, and at two sides of the relief groove 16 are formed engaging-projection sections 17a and 17b.

Figure 7A:
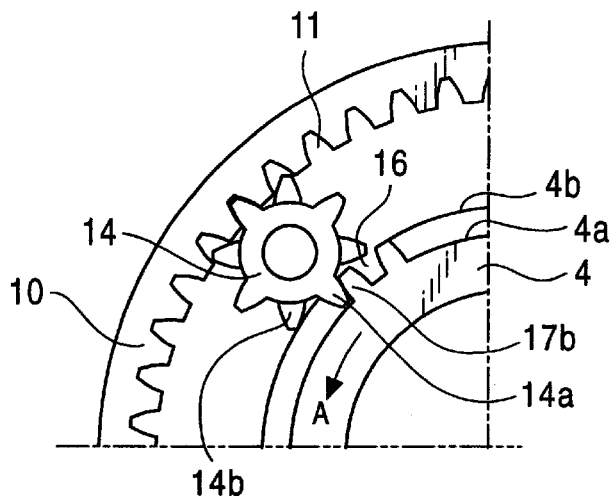
FIG. 7 is illustrative of operation of the gear mechanism.
Figure 7B:
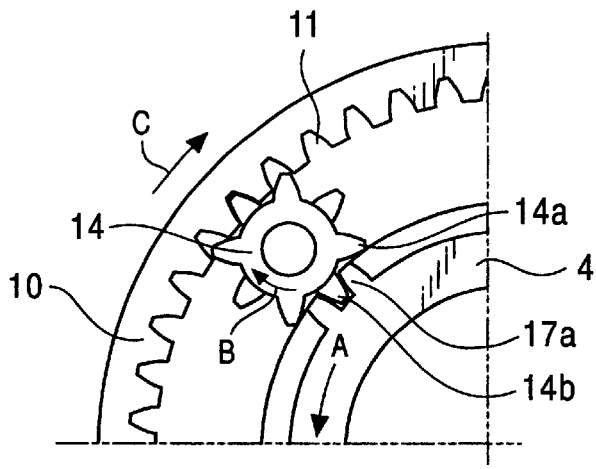
Figure 7C:
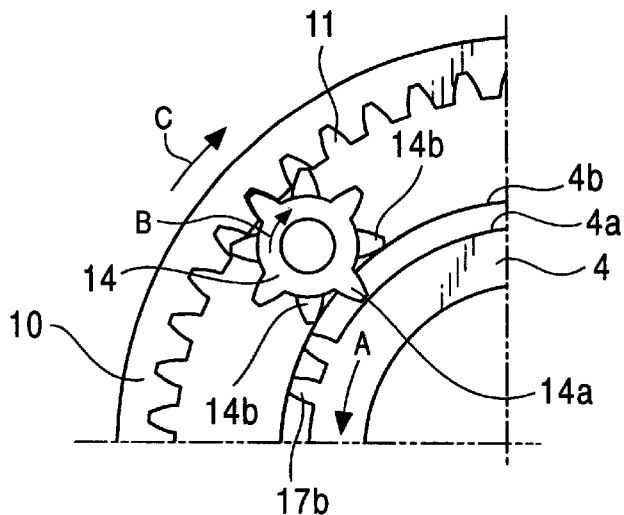

As shown in FIG. 7A, when a first rotor 4 rotates in the direction of arrow A (counterclockwise direction), one tooth of the first toothed section 14a opposing the small-diameter section 4a contacts the engaging-projection section 17a. Therefore, as shown in FIG. 7B, the intermediate gear 14 rotates by substantially 45 degrees in the direction of arrow B, and one of the second toothed section 14b engages with the relief groove 16.

When the first rotor 4 further rotates from the above state in the direction of arrow A, one tooth second toothed section 14b being engaged with the relief groove 16 is pushed by the other engaging-projection section 17a. Then, the intermediate gear 14 further rotates by substantially 45 degrees in the direction of arrow B, and next, one tooth of the first toothed section 14a opposes again the small-diameter section 4a. Specifically, the intermediate gear 14 rotates by substantially 90 degrees until the state in FIG. 7A changes to the state in FIG. 7C. Therefore, the driven gear 11 is fed by two teeth in the direction of arrow C, and the rotary ring 10 rotates in the direction of arrow C by a determined amount of rotation. Consecutively, when the engaging-projection section 17a passes the intermediate gear 14, two teeth of the second toothed section 14b oppose the large-diameter section 4b during the subsequent rotation of the first rotor 4. Therefore, non-engaging rotation of the intermediate gear 14 can be avoided.

In this way, during one revolution of the first rotor 4, the intermediate gear 14 is rotated by substantially 90 degrees by the engaging-projection sections 17a and 17b. Therefore, the light shield 10a also rotates by two teeth in the same direction and moves to a position where an adjacent photointerrupter emits light. That is, since the photointerrupters 13a to 13d that are switched on produces variable outputs, an absolute position (amount of rotation) of the first rotor 4 can thereby be detected.

In installation of the rotation detector configured in the above manner in a steering unit of a motor vehicle, the rotary ring 10 which is a component of the absolute-type encoder must be set at a neutral position. In this case, as shown in FIG. 2, when the indicator 12 is visible from the outside of the housing 1 through the detection window 1b, the rotary ring 10 can be determined to have been set to the neutral position. On the contrary, if the indicator 12 is invisible through the detection window 1b, the rotary ring 10 can be determined to have been set to a position deviated from the neutral position. In this case, the position of the rotary ring 10 must be adjusted to the neutral position by rotating the rotor member 2.

In this way, since the neutral position of the rotary ring 10 can be visually checked, efficiency in the installation of the rotation detector in the steering unit can be improved. Particularly, this embodiment has the detection window 1b formed on the outer peripheral wall of the housing 1. Therefore, even after the rotation detector is mounted between a combination switch and a rotation connector or a steering wheel (which are not shown), existence of the indicator 12 can be confirmed from a lateral side thereof on the outside.

When the rotation detector is installed in the steering unit as described above, the rotor member 2 of the rotation detector rotates together with a steering shaft (not shown). Hereinbelow, a description regarding operation regarding the rotation detector is given. For instance, as shown in FIG. 5, when the photointerrupter 13c is shielded by the light shield 10a, only the photointerrupter 13c turns on, and the other photointerrupters 13a, 13b, and 13d turn off. In this case, the steering wheel is detected to be within a range of o to 360 degrees with respect to the center reference thereof. On the other hand, the rotation angle of the steering wheel within a range of 0 to 360 degrees is detected with high accuracy by the individual photointerrupters 9 of the increment-type encoder.

When the rotor member 2 (the first rotor 4) rotates counterclockwise from the state shown in FIG. 5, and the light shield 10a shields both the photointerrupter 13c and the adjacent photointerrupter 13d, these photointerrupters 13c and 13d turn on. Thereby, the steering wheel is detected to be in the position of 360 degrees. When the rotor member 2 further rotates counterclockwise, and only the photointerrupter 13d turns on, the steering wheel is detected to be within a range of 360 to 720 degrees. Concurrently, the rotation angle of the steering wheel within the above detected range is detected with high accuracy by the increment-type encoder. In a manner similar to the above, according to combinations of on/off operations of the individual photointerrupters 13a to 13d, the steering wheel is detected to be within a range of −720 to +720 degrees.

Figure 8:
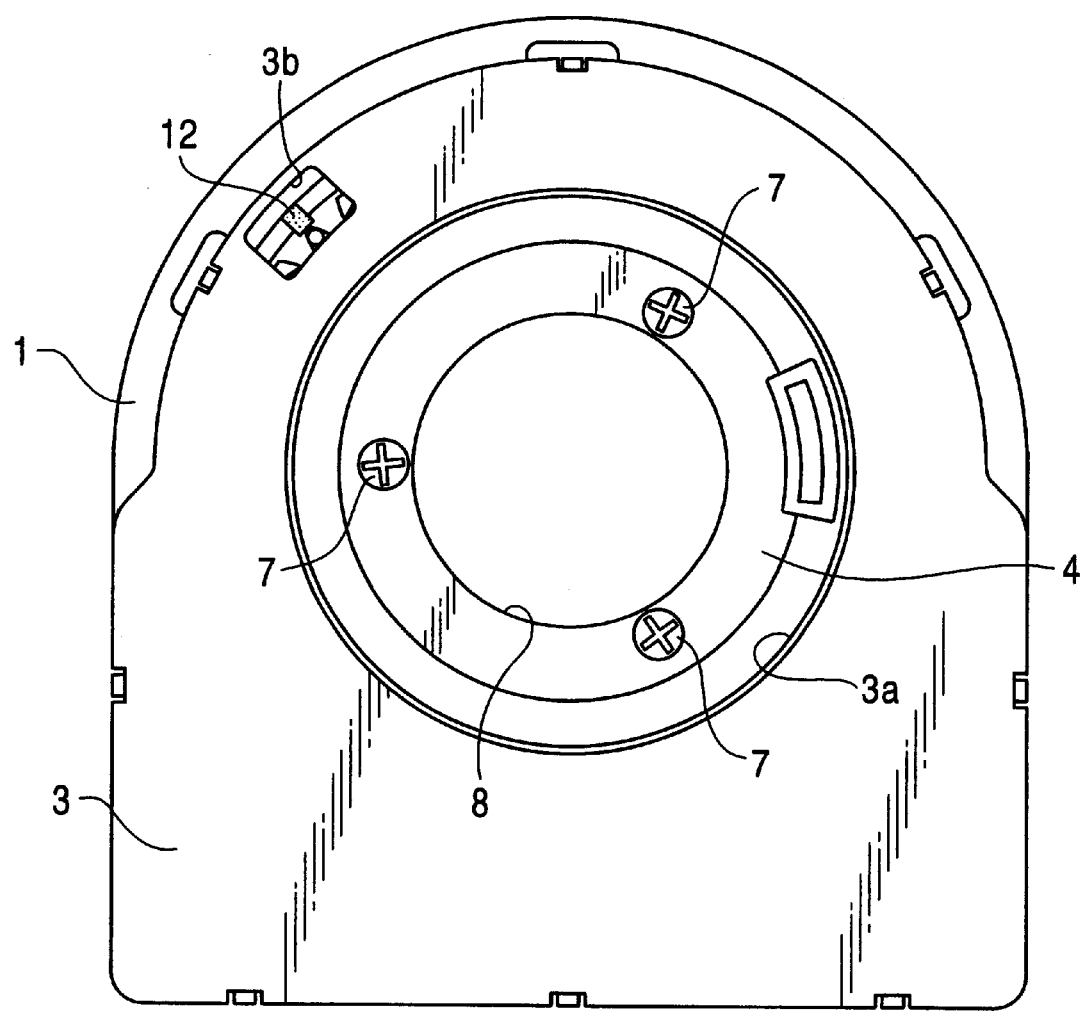
FIG. 8 is a bottom plan view of a rotation detector according to another embodiment of the present invention.

The above embodiment is described in a case in which the detection window 1b is formed on the outer peripheral wall of the housing 1. The arrangement location of the detection window 1b is, however, not limited to the outer peripheral wall. As a detection window 3b in FIG. 8, the detection window may be formed on a cover 3 so that an indicator 12 arranged inside can be viewed through the detection window 3b. That is, the detection window may be arranged at an appropriate location as required as long as it is a member constituting the stator member.

For reference, a colorless or colored transparent cover may be used to cover the detection windows 1b and 3b for improvement in dust-proofness.

The above embodiment is also described in a case in which the driven gear 11 is arranged on the rotary ring 10, and the intermediate gear 14 that engages with the driven gear 11 is supported by the housing 1. As in an embodiment shown in FIG. 9, however, a driven gear 11 may be arranged on a housing 1 on an immobilized side so as not to rotate. In addition, an intermediate gear 14 may be arranged on a rotary ring 10.

In this case, an indicator 12 is arranged on the intermediate gear 14 supported by the rotary ring 10. Also, a detection window through which the indicator 12 can be viewed is arranged on a cover (not shown). The position of the indicator 12 is, however, not limited to the intermediate gear 14, and it may instead be arranged on the rotary ring 10.

Figure 9:
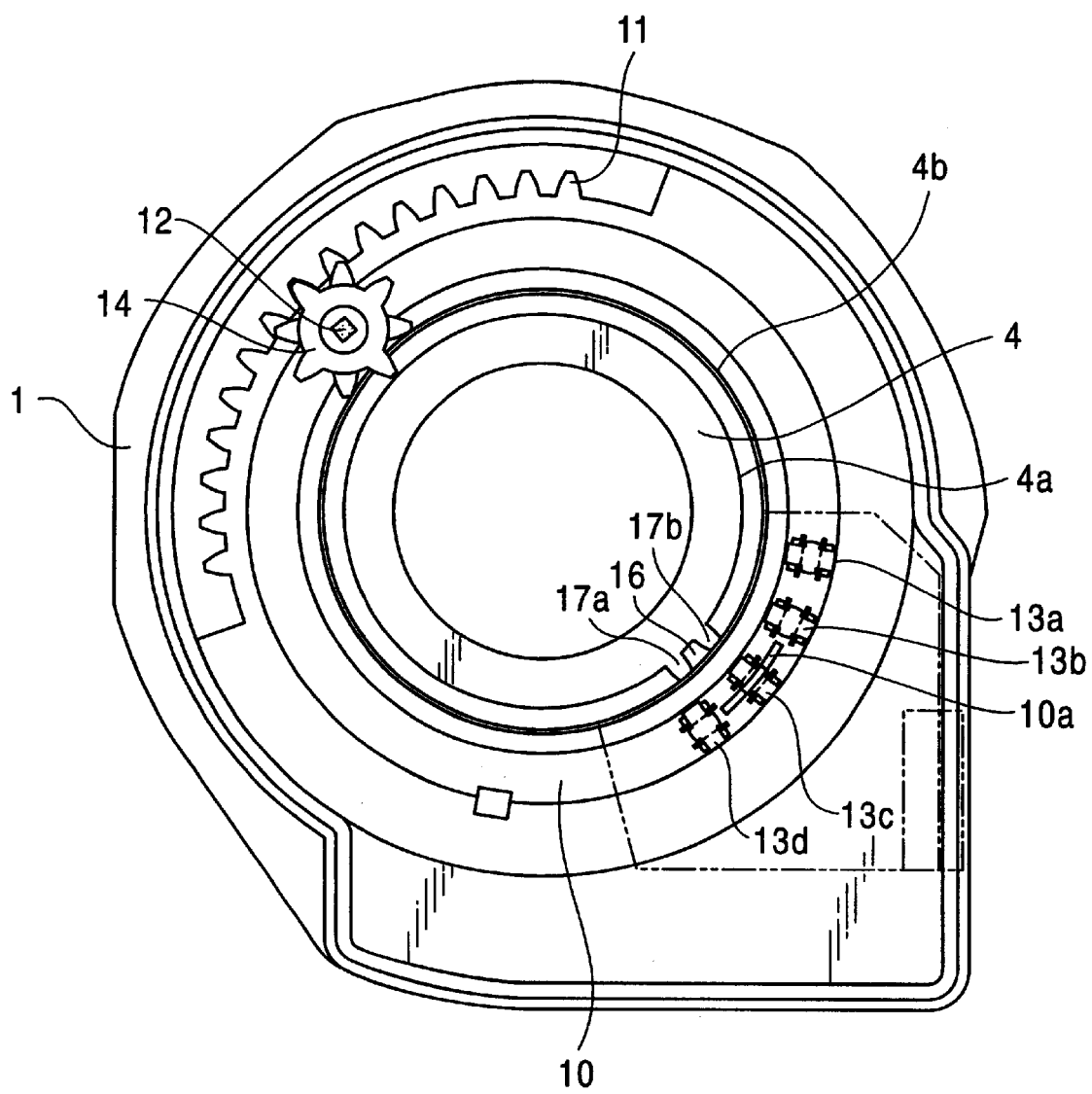
FIG. 9 is a bottom plan view of main portions of a rotation detector according to another embodiment of the present invention.

In the embodiment shown in FIG. 9, during one revolution of a first rotor 4, when the intermediate gear 14 is rotated by engaging-projection sections 17a and 17b, the intermediate gear 14 rotates by substantially 90 degrees and also rotates around a first rotor 4. Therefore, the rotary ring 10 which supports the intermediate gear 14 rotates by two teeth of the driven gear 11. Accordingly, a light shield 10a arranged on the rotary ring 10 also rotates by two teeth, moving to the position where the adjacent photointerrupter shields light. That is, since outputs of the turned-on photointerrupters 13a to 13d vary, an absolute position (amount of rotation) of the first rotor 4 is thereby detected.

What is claimed is:

1. A rotation detector for a multi-rotation body, comprising:

a rotor member having a code plate of a rotary encoder and integrally rotating with the code plate, the rotor member being attached to the multi-rotation body to integrally rotate with the multi-rotation body;

first detecting elements that detect a rough rotation angle of more than one revolution of the multi-rotation body in cooperation with the code plate;

a rotary member arranged concentrically with a center of rotation of the rotor member, the rotary member having a driven gear along a rotation direction thereof;

an intermediate gear engaged with the driven gear of the rotary member that intermittently transmits rotation of the rotor member to the rotary member;

second detecting elements that detect an amount of rotation of the rotary member rotating in accordance with rotation of the intermediate gear, and that detect a precise rotation angle of more than one revolution of the rotation body; and a stator member enclosing the rotor member, the rotary member, the intermediate gear, and the first and second detecting elements, wherein the stator member includes a detection window through which an indicator that indicates a neutral rotation position of the rotary member is viewable from the outside of the stator member.

2. A rotation detector for a multi-rotation body, according to claim 1, wherein the intermediate gear is supported by the stator member, and the indicator is arranged on the rotary member.

3. A rotation detector for a multi-rotation body, according to claim 1, wherein the intermediate gear is supported by the rotary member, and the indicator is arranged on at least one of the intermediate gear and the rotary member.

4. A rotation detector for a multi-rotation body, according to claim 2, wherein the stator member includes a hollow housing and the detection window is arranged on the housing.

5. A rotation detector for a multi-rotation body, according to claim 3, wherein the stator member includes a hollow housing such that an upper part and a lower part thereof are opened and the detection window is arranged on the housing.

6. A rotation detector for a multi-rotation body, according to claim 2, wherein the stator member includes a hollow housing and the detection window is arranged on a cover of the stator member.

7. A rotation detector for a multi-rotation body, according to claim 3, wherein the stator member includes a hollow housing and the detection window is arranged on a cover of the stator member.

8. A rotation detector for a multi-rotation body, according to claim 1, wherein an engaging portion is provided on a peripheral surface of the rotor member and engages with the intermediate gear.

9. A rotation detector for a multi-rotation body, according to claim 2, wherein an engaging portion is provided on a peripheral surface of the rotor member and engages with the intermediate gear.

10. A rotation detector for a multi-rotation body, according to claim 3, wherein an engaging portion is provided on a peripheral surface of the rotor member and engages with the intermediate gear.

11. A rotation detector for a multi-rotation body, according to claim 1, wherein:

the first detecting elements include a plurality of throughholes disposed on the code plate along a circumferential direction thereof and a plurality of first photodetectors arranged to cross the throughholes;

the rotary member has a light shield; and the second detecting elements include a plurality of second photodetectors arranged to cross the light shield.

12. A rotation detector for a multi-rotation body, according to claim 2, wherein:

the first detecting elements include a plurality of throughholes disposed on the code plate along a circumferential direction thereof and a plurality of first photodetectors arranged to cross the throughholes;

the rotary member has a light shield; and the second detecting elements include a plurality of second photodetectors arranged to cross the light shield.

13. A rotation detector for a multi-rotation body, according to claim 3, wherein:

the first detecting elements include a plurality of throughholes disposed on the code plate along a circumferential direction thereof and a plurality of first photodetectors arranged to cross the throughholes;

the rotary member has a light shield; and the second detecting elements include a plurality of second photodetectors arranged to cross the light shield.

\* \* \* \* \*